United States Patent [19]
Birk et al.

[11] Patent Number: 5,157,765
[45] Date of Patent: Oct. 20, 1992

[54] METHOD AND APPARATUS FOR PIPELINED PARALLEL RASTERIZATION

[75] Inventors: Yitzhak Birk, Palo Alto; James M. McCrossin, San Jose, both of Calif.

[73] Assignee: International Business Machines Corporation, Armonk, N.Y.

[21] Appl. No.: 818,406

[22] Filed: Jan. 3, 1992

Related U.S. Application Data

[63] Continuation of Ser. No. 437,428, Nov. 15, 1989, abandoned.

[51] Int. Cl.⁵ .............................................. G06F 15/20
[52] U.S. Cl. ..................................... 395/163; 395/160
[58] Field of Search ................................. 395/141-143, 395/162-163, 121, 135

[56] References Cited

U.S. PATENT DOCUMENTS

| | | | |
|---|---|---|---|
| 4,254,467 | 3/1981 | Davis et al. | 364/521 |
| 4,458,330 | 7/1984 | Imsand et al. | 364/900 |
| 4,837,447 | 6/1989 | Pierce et al. | 364/521 X |
| 4,912,659 | 3/1990 | Liang | 364/521 |

OTHER PUBLICATIONS

Ben-Dor et al., "New Graphics Controller for Electrostatic Plotting", IEEE CG&A, pp. 16–25, Jan. 1986.

Plouffe et al., "Advanced Function Printer Controller", IBM Almaden Research Center, Jan. 22, 1987.

Primary Examiner—Heather R. Herndon
Attorney, Agent, or Firm—Pryor A. Garnett

[57] ABSTRACT

A rasterizer 10 for converting a datastream 12 which describes a page to be printed into a rasterized pagemap bitstream 13 to be sent to a printer. The rasterization is done in four stages using parallel processors in all stages except the first, and pipelining the processors between all of the stages. In the first stage 11, a scan processor 14 identifies and stores state-independent blocks 14 in the datastream. In the second stage 17, parallel block processors 22 convert the scanned blocks into stored intermediate-form data objects 20 and request preparation of often-used resources such as characters. In the third stage 23, the objects are sorted and stored by geographical region of the pagemap by parallel sort processors 24. In the fourth stage 31, the sorted objects are rasterized into pelmaps and placed in the pagemap by parallel bin processors 30. All four stages are pipelined. End-of-block markers are used in the third and fourth stages to maintain correct ordering of the objects within the final pagemap. The rasterizer uses general purpose microprocessors for all stages.

26 Claims, 10 Drawing Sheets

BLOCK DIAGRAM

BLOCK DIAGRAM
FIG. 1

FIG. 2 FIRST STAGE – SCAN FOR BLOCKS

FIG. 3 SECOND STAGE — INTERMEDIATE-FORM OBJECTS AND RESOURCE PREPARATION REQUESTS

FIG. 4 RESOURCE PREPARATION PROCESS

FIG. 5  THIRD STAGE — SORT INTO GEOGRAPHICAL BINS

FIG. 6 FOURTH STAGE — BUILD THE PAGEMAP

SCHEMATIC FLOWCHART

FIG. 7

```
101  Get next block of intermediate-form objects
102  Acquire R work areas /* R is the number of regions in a page */
103  Store block sequence number at the beginning of each work area /*(bin)*/
104  Repeat /* one iteration per intermediate-form object */
105      Get next object
106      If not end-of-block
107          For i = 1 to R
108              If part of object lies in region i
109                  Append copy of object to contents of work area i
110      Else /* end of block */
111          Append end-of-block marker to contents of all work areas
112          Set end-of-block flag
113  Until end-of-block flag is set /* end of block */

114  For i = 1 to R
115      Insert a pointer to work area i into the fourth stage work queue for
         region i
```

SORTING PSEUDOCODE FOR A SINGLE SORT PROCESSOR

FIG. 8

```
201  Get next bin to be processed /* from a work queue */
202      Acquire a pelmap /* size of the bin's region on the pagemap */
203  Repeat
204      Get pointer to next intermediate-form block from fourth stage work
         queue /* initially gets pointer to first block */
205      While not end-of-block marker
206          Get next object /* if end-of-block, the "while" will discover it */
207          If no object then Wait for next object
208          If self contained object
208a             Merge into pagemap /* e.g. black rectangle */
209          Else /* reference to resource */
210              If resource not ready then
211                  Wait until resource is ready
212              Else /* resource already prepared */
213                  Merge resource into pagemap 214  Until end-of-page
```

PAGEMAP BUILDING PSEUDOCODE WITHIN A SINGLE BIN PROCESSOR

METHOD AND APPARATUS FOR PIPELINED PARALLEL RASTERIZATION

This is a continuation of copending application Ser. No. 07/437,428 filed on Nov. 15, 1989, now abandoned.

BACKGROUND OF THE INVENTION

1. Technical Field

This invention relates to rasterization, and more particularly to rasterization by parallel processors for use in printing and other batch rasterization applications.

2. Description of the Prior Art

The transition from typewriter-like printers (a fixed set of preformed characters that could only be positioned at specific places on a page) to all-points-addressable ("APA") printing devices, in which a page consists of millions of tiny dots (also known as "picture elements", or "pels" for short) has paved the way to computer printing of complex documents. The page-description languages that emerged to facilitate the process of specifying the content of complex pages require extensive processing in order to determine the darkness or color of each of the millions of pels that constitute the page's content. High-speed printers have advanced so rapidly as to outstrip the processing power available to determine page content, thus creating a processing bottleneck. The present invention addresses this bottleneck.

The printing process begins with an application program, such as a document formatter, which generates a specification of a page's content in a page-description language ("PDL"). Page content expressed in a PDL is called a "datastream". Examples of PDL commands which could be included in a datastream are:

'Draw a circle of radius three inches (8 cm) centered five inches (13 cm) below the page's top margin and four inches (10 cm) from the page's left margin, and fill the circle with the color magenta.'

'Write the words "Now is the time for all good" horizontally, beginning 3.75 inches (9.5 cm) below the page's top margin and 1 inch (2.5 cm) from the page's left margin, using the font "Times Roman" in a size of 12 printer points.'

Once the datastream has been generated, for it to be printed or displayed it must be converted into a collection of several million numbers, each number representing the color of one picture element (pel) on the page. This collection of numbers is called the "pagemap", and the conversion process is referred to as "rasterization".

The determination of which objects (or parts of objects) are visible on the final pagemap or display is usually made differently for two-dimensional ("2-D") objects than for three-dimensional ("3-D") ones. 3-D objects have the third dimension of depth, and their visibility is determined by depth information which is an integral part of an object's description. Since the objects contain the depth information, the order in which they are rasterized and applied to the pagemap is not important.

In the case of 2-D objects, the visibility of an object is typically determined by a combination of its location in the datastream and a "mixing mode". In the "overpaint" mixing mode, for example, a "later" object always hides an "earlier" one. More generally, in mixing modes the new value of a pel which is being colored by a new object is always a predetermined function of the old value and the pel color provided by the new object. For this to be done correctly, however, different objects that affect the same pel must do so in the same order as their order of appearance in the datastream. The use of mixing modes to determine visibility adds some characteristics of a third "depth" dimension to the rasterization of two-dimensional objects, and such rasterization is therefore often referred to as "2-D rasterization".

The adoption of all-points-addressable (APA) printing in conjunction with "advanced function" PDLs has brought about a dramatic increase in the amount of processing required for the rasterization of a page. A rasterizer may now be required to process fonts whose characters are described by curves representing their outlines. The characters must be scaled to arbitrary sizes and rotated at arbitrary angles. The rasterizer may also be required to scale (expand, contract or stretch) graphical objects, rotate them, and convert them to bitmaps, as well as to scale and rotate already-bit-mapped images. Furthermore, masks may be used to limit ("clip") the scope of an object, and various mixing modes may be used to specify the result of placing overlapping objects. Finally, these PDLs also have the features of general-purpose programming languages, such as conditional branching, which require processing akin to general-purpose digital computers such as mainframes and personal computers. And recently the introduction of color in printers has further increased the processing demands on rasterizers.

The simplest way to implement a rasterizer is with a single processor. However, as the required processing rate increases, the cost of the processor and the associated components such as memory, increases dramatically, eventually making cost-effective high-speed printers an impossibility. Preparing pages for high-speed printers requires both faster and more powerful processing than is available from single moderate-cost microprocessors. Since, beyond a certain speed, the cost of a processor grows faster than its processing speed (i.e., 5 slow processors are less expensive than a single one that is 5 times faster), high-speed single-processor rasterizers are not competitive.

To keep the cost of the rasterizer manageable, as well as for other reasons such as incremental growth capability, it is therefore highly desirable to have several inexpensive processors collaborate rather than use a single, very expensive processor.

Significant problems and challenges must be addressed when designing a multiprocessor rasterizer. The design should attain a significant degree of parallelism, in order to achieve a high overall processing rate. The design should minimize overhead and duplication of effort by the processors, since these increase the total amount of work done for a given page, and hence reduce the effective increase in performance. The design should minimize the sensitivity of processor utilization to page content. And the design should require less memory than a single-processor rasterizer of equal performance, in order to make it competitive.

Beyond these goals, two essential requirements must be met. First, the datastream environment (cursor position, scale factor, current font, etc.) must be available at the beginning of each segment so that its processing can begin immediately independently of other segments. Second, the impressions of the segments on the pagemap must not overlap, because if they do the order in which the segments are processed and their impressions are applied may affect the final appearance.

The prior art contains several approaches toward multi-processor rasterization. In "pipelined rasterizers" the rasterization is broken into stages, and those are "pipelined" so that a different processor works on each stage, passing its results to the processor working on the next stage along the pipeline. These rasterizers satisfy both the first and second requirements, since every processor sees the entire datastream in the correct order, and only one processor updates the pagemap. The pipelined design is also quite efficient in terms of memory requirements. However the level of parallelism is limited by the number of possible stages to be pipelined, which is no more than 2 or 3. Furthermore, the relative processing load on the different pipelined processors is sensitive to the page content. As a result, pipelined rasterizers are usually no more than twice as fast as single-processor rasterizers (i.e. their speedup factor is usually smaller than 2).

In "page-parallel" rasterizers each processor works on a different page. With this design the first requirement is usually easy to satisfy, since sufficient information is usually available at the beginning of the page. The second requirement is always satisfied since pages (by definition) do not overlap, and a high degree of parallelism is achievable. However, very large amounts of memory are required and the rasterization time of a single page is not reduced. Also, processor utilization drops significantly whenever the page-rasterization time is highly variable (such as when simple and complex pages are mixed together), unless much more memory is used. Since pages must be printed in a specific order, when a page-parallel rasterizer is faced with a difficult page followed by several easy pages, the printing engine (the printer) along with all but one of the processors must lay idle, waiting for the processor working on the difficult page to complete it.

In rasterizers which use "functional parallelism", blocks of different types (e.g., image, text, graphics) are rasterized independently and the results are merged sequentially into the pagemap. This can only offer moderate parallelism due to the limited number of types of blocks. Further, the effective parallelism achieved in a given page is very sensitive to the relative processing loads for the different types and hence to the content of the page. And finally, the last part of the rasterization, in which the blocks are merged into the pagemap, is not parallelized.

Efforts to create rasterizers which exploit "geographic parallelism" have not succeeded without limiting the mixing mode to "OR", which causes superposed images to be merged together without regard for which would overlap the other. Geographical parallelism is based on the intuition that it makes sense to build different regions of a page in parallel. However, the perceived need to satisfy the second requirement at the outset of the rasterization process has prevented the realization of this idea for other mixing modes.

"3-D rasterizers with Z-buffers" are exemplified by the "Superdisplays" proposed by Pavicic, in which "object processors" prepare rasterized "objects" and send them to "image processors" (smart memory). Each rasterized object from a given location is fed to a designated image processor for that location. The object includes an intensity "I" and a "z" value (depth) for each pel. Whenever an image processor receives a new object having (x,y,z,I) values, it compares the z value with the one it is currently holding. If the new value of z is larger than the old one (i.e. if the new object is deeper), the image processor discards the new entry, otherwise it replaces the old value with the new one. It is possible to keep around several values to accommodate objects which only partly color pels. The Z-buffer design is aimed at displays rather than printers. In display rasterizers, typically, lists of independent 3-D objects undergo incremental changes, such as the addition or deletion of new objects, and changes to old objects. Z-buffers are not very efficient for batch 2-D rasterizations of entire displays (pagemaps), since their image processors update pels individually, thus not taking advantage of the fact that with 2-D objects and an overpaint mixing mode (also known as order-implied depth), the last object covers all previous ones. Even if the mixing mode is not overpaint, the same operation sis performed on all affected pels and incremental update is inefficient. Thus, most APA printer rasterizers use batch rasterization since successive pages are not mere updates of previously printed pages. Also, Z-buffers rely heavily on the notion of overpainting of a deep object by a shallow one, and do not lend themselves to more complicated operations in which the result intensity and color are an arbitrary function of the past one and new one, since to do so would require a possibly infinite list of past (z,I) values for every pel (Z-buffer), there being no concept of completing the rasterization for a given depth range. Finally, Z-buffer technology has no concepts of finding state-independent objects and resource preparation (discussed below).

The "Raster Processing Machine" (RPM) described by A. Ben-Dor and Brian Jones, Versatec, in "New Graphics Controller for Electrostatic Plotting, IEEE CG&A, pp. 16-25, January 1986, was developed for electrostatic plotters which do not have a full pagemap. Incoming graphical objects are converted sequentially (not in parallel) into an internal format, which produces a bottleneck limiting the rasterizer's performance. The converted objects are then sorted by geographic location into bins corresponding to the size of the raster buffers of the machine (bands of pelmap). Once this process is completed, the bins are processed, possibly in parallel, and the results are placed into the appropriate partial pelmaps. The partial pelmaps are then combined together without regard for the sequencing of objects in the data stream. If two objects are superposed on the page they are blended together and printed.

SUMMARY OF THE INVENTION

This invention comprises a computer-implemented method for rasterizing a datastream specifying at lease one output image. A first step identifies state-independent blocks within the datastream. These blocks are then converted in parallel into intermediate-form data. The intermediate-form data for at least two geographical regions of the image is then converted in parallel into rasterized pelmaps representing at least part of the image. This method may optionally also include a parallel step of preparing reusable intermediate-form data resources which are incorporated into the pelmaps.

The invention also comprises a system for rasterizing a datastream specifying at least one output image. The system includes means for identifying state-independent blocks within the datastream, and at least two parallel-processing means for converting the blocks into intermediate-form data. The system also includes at least two parallel-processing means for converting the intermediate-form data into rasterized pelmaps of at least two respective geographic regions of the image. The system preferably also includes means for reusing intermediate-form data for frequently-used items in the datastream. The means for identifying blocks, the means for converting blocks, the means for sorting, and the means for converting intermediate-form data, are preferably general purpose microprocessors.

Further, the invention also comprises a computer program product recorded on magnetic or like media for rasterizing a datastream specifying at least one output image.

Other features and advantages of this invention will become apparent from the following detailed description of the presently preferred embodiment of the invention, taken in conjunction with the accompanying drawings.

DESCRIPTION OF THE PREFERRED EMBODIMENT

Background

This invention is applicable whenever a high-level description of a collection of two-dimensional objects is to be converted into a single pagemap or any other type of pel-map representation. The rasterizer 10 of the preferred embodiment prepares pagemaps for all-points-addressable-(APA) computer-driven printers.

The main technical advance provided by this invention is cost effectiveness. The cost of producing a high-speed multi-processor printer rasterizer 10 using the preferred embodiment will be significantly less than the cost of producing a single-processor rasterizer of equal speed. Other advantages provided by the preferred embodiment include: (i) its efficient use of hardware, i.e. the minimization of overhead and duplicated work; (ii) the flexibility offered by its design; (iii) its scalability, i.e. the ease by which the number of processors in any stage can be increased or reduced; and (iv) the slow growth in the invention's memory requirements as the number of processors is increased. Our efficient use of hardware is the result of careful design of the synchronization among the collaborating processors, and of a careful allocation of memory among different uses. The flexible design and scalability is primarily provided by our use of general purpose processors for all stages of the rasterization, so that any processor may work on any stage. It will be understood, however, that while these choices are preferred they are not mandatory for the correct operation of the invention.

Overview

Figure 1:
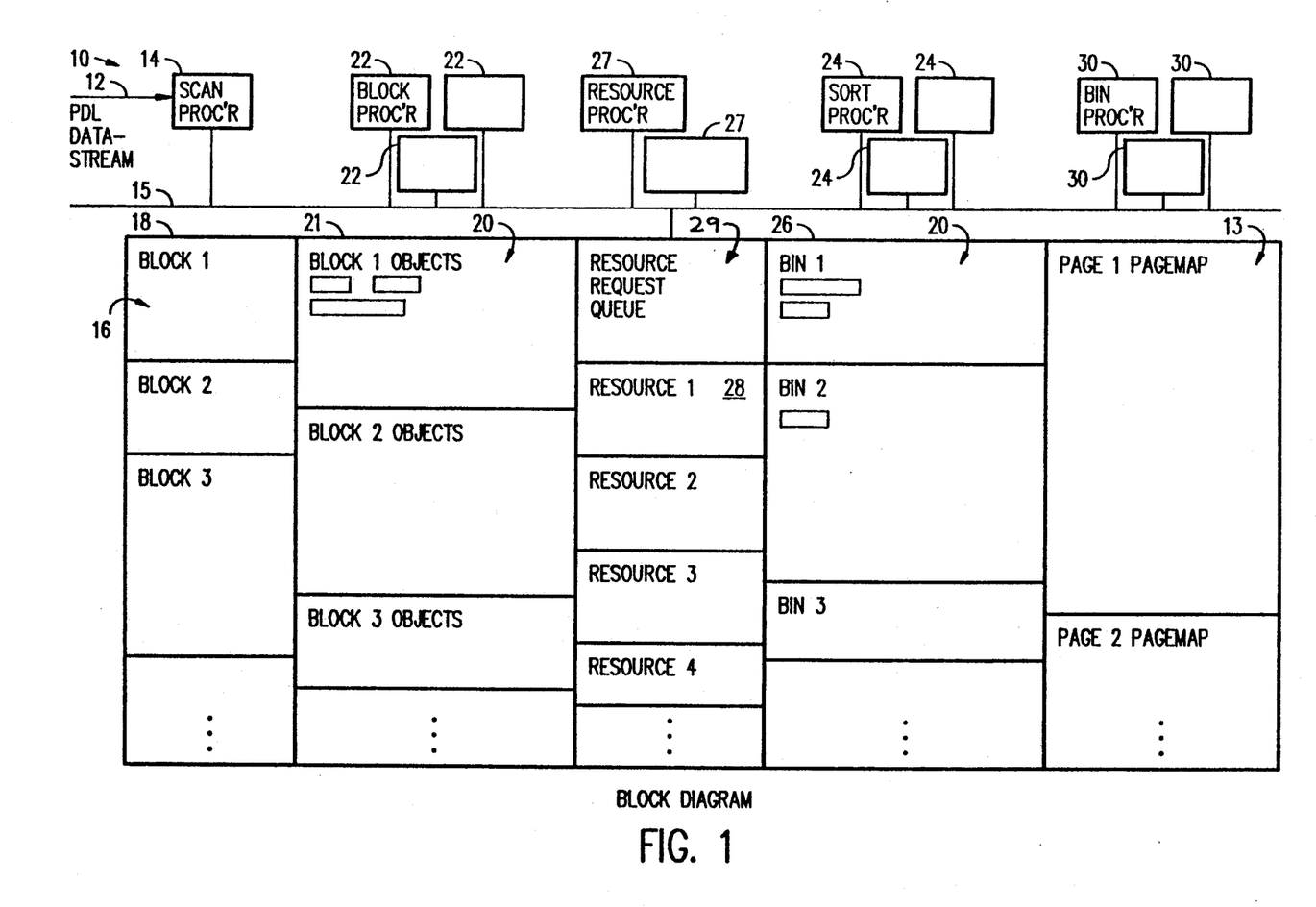
FIG. 1 is a block diagram of our preferred embodiment of a multi-processor printer rasterizer according to the invention.
Figure 7:
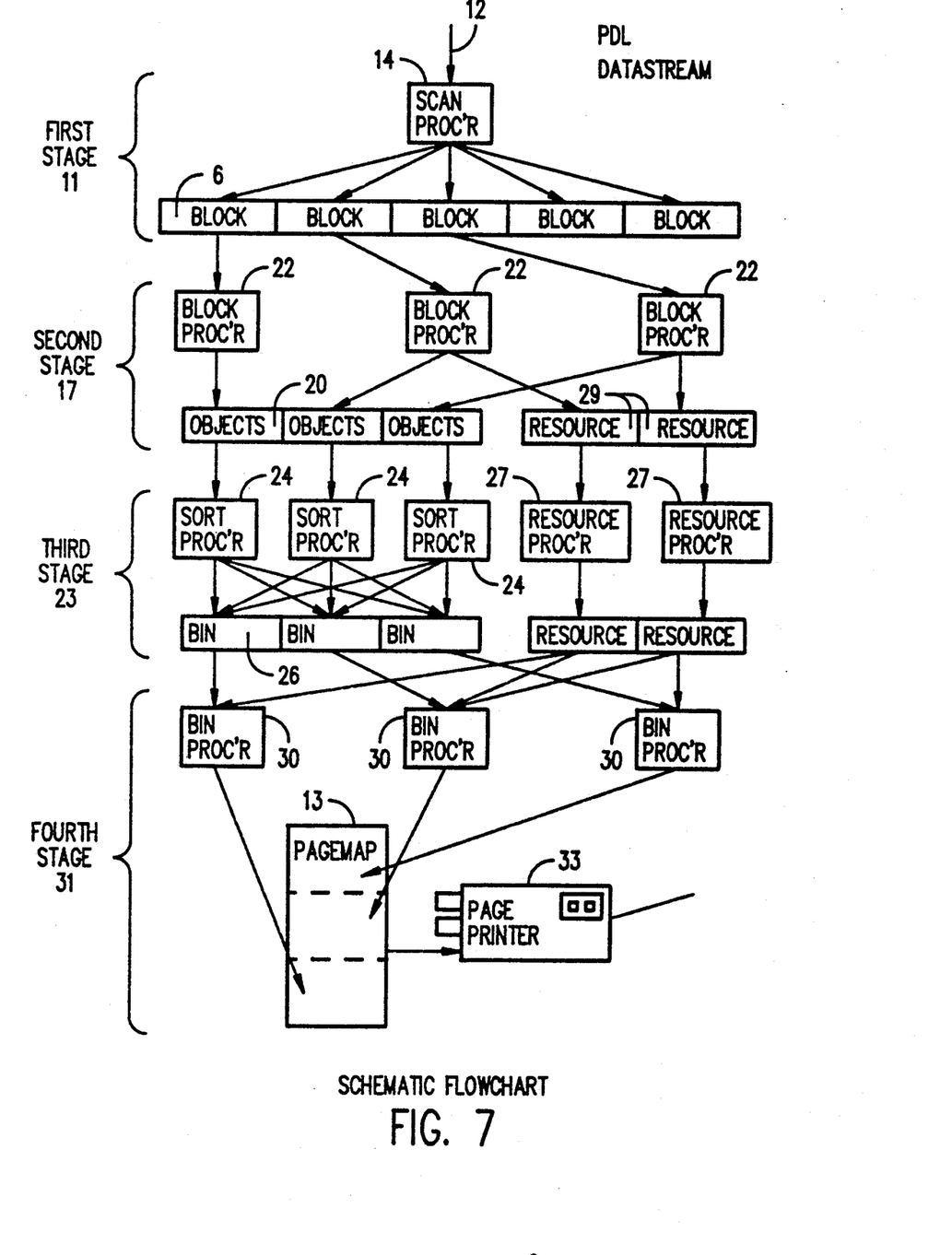
FIG. 7 is a schematic diagram of the operation of the rasterizer of FIG. 1, showing the parallel processing within each stage and the pipelining between stages.

Referring first to FIGS. 1 and 7, the rasterizer 10 of this invention converts an object-oriented "datastream" 12 (which describes the content of a page in a page description language, or "PDL") into a "pagemap" 13 (a rasterized set of bits) to be sent to an all-points-addressable (APA) device such as (preferably) a laser printer. The conversion (rasterizing) is done in four stages, using multiple processors in all stages except the first.

In the first stage 11, a single "scan processor" processor 14 scans the incoming PDL datastream 12 to identify state-independent "blocks" 16. Each block is tagged with a "sequence number" and stored in a common memory 18 available to all the processors, including those working on subsequent stages.

In the second stage 17, the PDL commands of each block 16 are converted sequentially into one or more "intermediate-form objects" 20 by one "block processor" 22, and stored in a portion of the common memory 18. Whenever a block processor 22 becomes available it takes the next scanned block 16, prepares intermediate-form objects 20 sequentially from the start of the block, and stores the objects along with the block's sequence number in a portion 21 of the common memory 18 reserved for that block's objects. This stage is thus carried out in parallel for different blocks by the multiple block processors 22.

In the third stage 23, multiple "sort processors" 24 sort the stored intermediate-form objects 22 into "bins" 26 according to their target geographical regions on the pagemap 13. Before beginning the work on a pagemap 13, it is divided into non-overlapping "geographical regions", and a bin 26 is constructed for each region. Again, objects belonging to the same block are processed sequentially by a single sort processor, but different blocks can be processed in parallel by several sort processors.

"Resource preparation" is done concurrently with the second and third stages 17, 23 by "resource processors" 27. From "resource preparation requests" 29 issued by the block processors 22 in the second stage 17 for multiply-used items such as characters, punctuation, numbers and symbols, the resource processors 27 produce intermediate-form data ("resources") 28 and store those resources in memory where they can be reused by the bin processors 30 of the fourth stage 31 without repreparation.

Finally, in the fourth stage 31, "bin processors" 30 rasterize the geographically sorted intermediate-form objects 20 stored in the bins 32, and store the resulting rasterized data (partial pagemaps, or "pelmaps") in memory as a pagemap 13 of the finished page. The pagemap 13 is then sent to an APA printer 33 to produce the actual, printed page specified by the datastream 12. To preserve the consistency of the finished pagemap 13 produced by this process, the intermediate-form objects 20 in any given bin are processed by a single bin processor 30 in order by block sequence number.

Each of the second, third and fourth stages, as well as the resource preparation process, is done in parallel by multiple processors. Because the first stage scan processor 14 produces state-independent blocks 16 having their own data processing environments, the second stage block processors 22 can process the blocks concurrently, i.e. in parallel. The third stage sort processors 24 sort the intermediate-form objects 20 into the bins 26 in parallel, each sort processor operating on the objects stored for a single block. The fourth stage bin processors 30 rasterize the contents of the bins 26 concurrently and independently of each other, but each bin is processed sequentially by a single bin processor. Whenever a resource processor 27 becomes free, is dequeues the next resource preparation request 29 on the resource preparation request queue (thereby bringing the next request to the head of the queue), and prepares the resource's intermediate-form data 28. Resources can thus also be prepared in parallel by multiple processors.

All four stges are pipelined, so that the next stage can begin even before the preceding stage has been completed. A block processor 22 begins working on a block 16 as soon as the scan processor 14 identifies the block's datastream processing environment. A sort processor 24 begins sorting a block's intermediate-form data 21 as soon as the block processor 22 has begun to generate intermediate-form objects 20, and before the block processor has finished with the block. A bin processor 30 begins working on a bin 26 of sorted intermediate-form objects 20 as soon as the sort processors 24 start filling that bin, and before the sort processors have finished with that bin. However a bin processor 30 working on a given bin 26 may not begin work on objects 20 in that bin which were generated from a successive block 16 until the bin processor encounters the "end-of-block" markers for all previous blocks, since additional objects for those previous blocks may yet arrive from sort processors 24. This requirement is necessary to ensure the consistency of the final pagemap 13.

The scan processors 14, block processors 22, resource processors 27, sort processors 24, and bin processors 30, are all preferably a single type general purpose microprocessors which communicate with the common memory 18 over a conventional common data bus 15. The processors may be programmed to work on any stage of the rasterization process, perhaps with the exception of the scan processor. This maximizes the flexibility of the design, permitting (among other things) dynamic assignment of memory for different purposes and dynamic assignment of processors to heavily used stages so as to prevent bottlenecks from developing. High-bandwidth communications between the processors and the common memory are needed.

Scanning—First Stage

Figure 2:
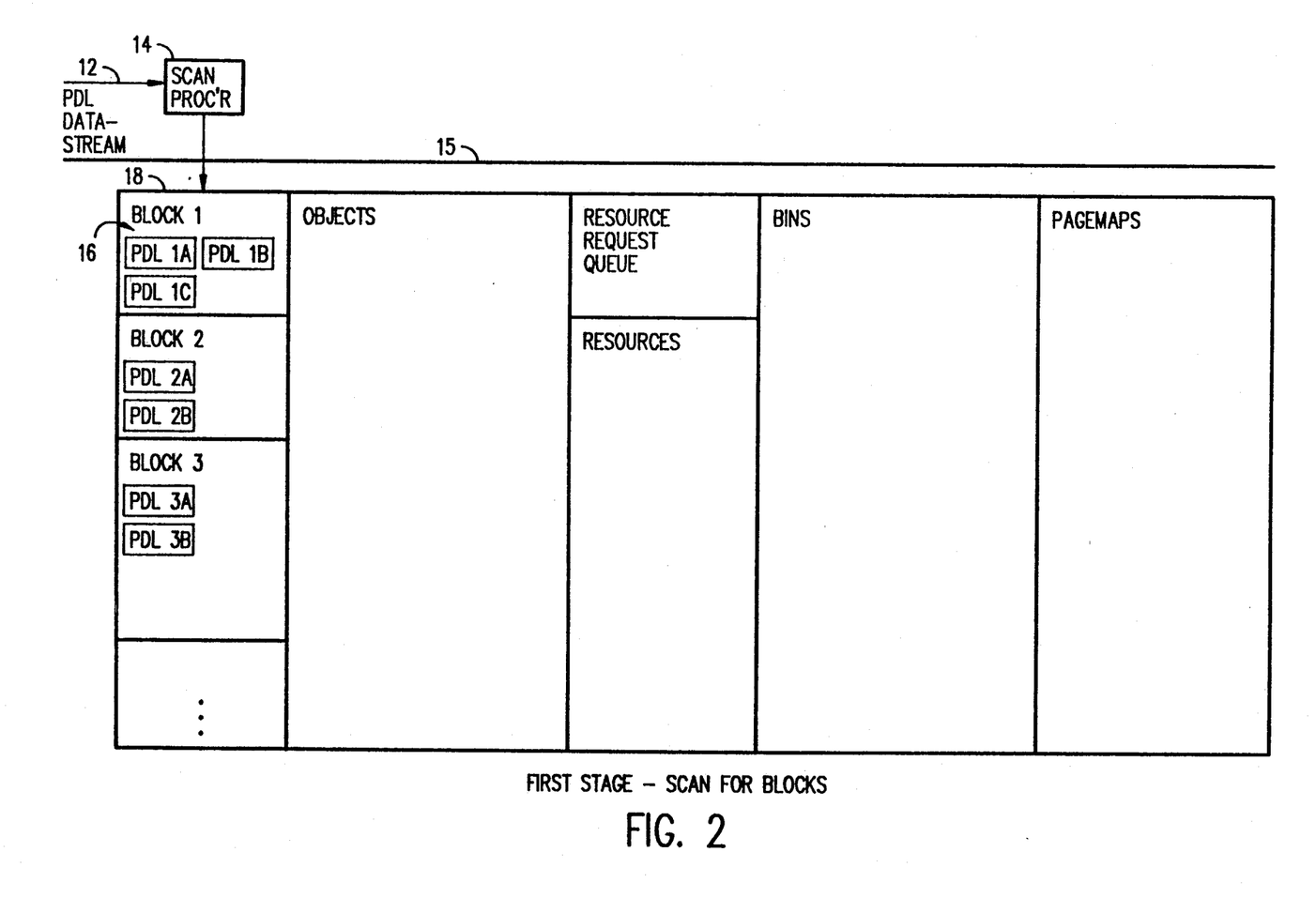
FIG. 2 is a block diagram of the first stage of the rasterizer of FIG. 1, during which the scan processor separates the incoming PDL datastream into state-independent blocks.

As shown in FIG. 2, the scan processor 14 receives as its input the datastream 12, which describes a sequence of pages in some page-description language (PDL). The scan processor's output is a slightly modified datastream, which is essentially the original datastream 12 partitioned into state-independent blocks 16 along with state information on block boundaries and a block sequence number 32 for each block. The blocks are "state-independent", which means that each block 16 contains sufficient information regarding its datastream processing environment (its "state") to allow the preparation of intermediate-form data. Such state information includes, for example, the current font being used for text characters and symbols, and the current scale and rotation to be applied.

The details of the scan processor depend entirely on the PDL being processed. In general, commands such as "move to position $X = 2.45$ inches (5.45 cm), $y = 7.43$ inches (18.75 cm)", "set current font to Times Roman Italic 12 point", and "set graphics state to scale $X = 1.0$, $y = 1.1$, rotation 90 degrees"

identify the beginnings of state-independent blocks. In the POSTSCRIPT PDL of Adobe Systems, Inc., commands such as "gsave "(graphics save) and "grestore" (graphics restore) can be used to identify blocks.

There is a trade-off between the amount of processing devoted to scanning and the resultant block sizes. A simple scan processor 14, for example, would simply look for page boundaries, thereby producing a single block 16 per pagemap 13 and simplifying the entire rasterizer 10. This is because all the objects 20 for any given pagemap are generated by a single block processor 22 in the correct order, and so each bin 26 will be filled by a single sort processor 24. The end-of-block markers and associated synchronization mechanism are thus no longer required. Yet even in this simple rasterizer, the pagemap 13 can be divided into geographical regions so as to allow multiple bin processors 30 to work on the same pagemap during the fourth (pagemap-building) stage, although the rasterizer's memory requirements will be increased because the rasterizer must be able to store the datastream for multiple complete pages.

At the other extreme, a very complex scan processor 14 will generate many blocks 16 per pagemap 13. The optimal complexity of the scan processors 14 depends on the difficulty of identifying state-independent blocks 16 in the PDL datastream 12, and on the desired complexity of the rest of the rasterizer 10.

Intermediate—form Objects—Second Stage

Figure 3:
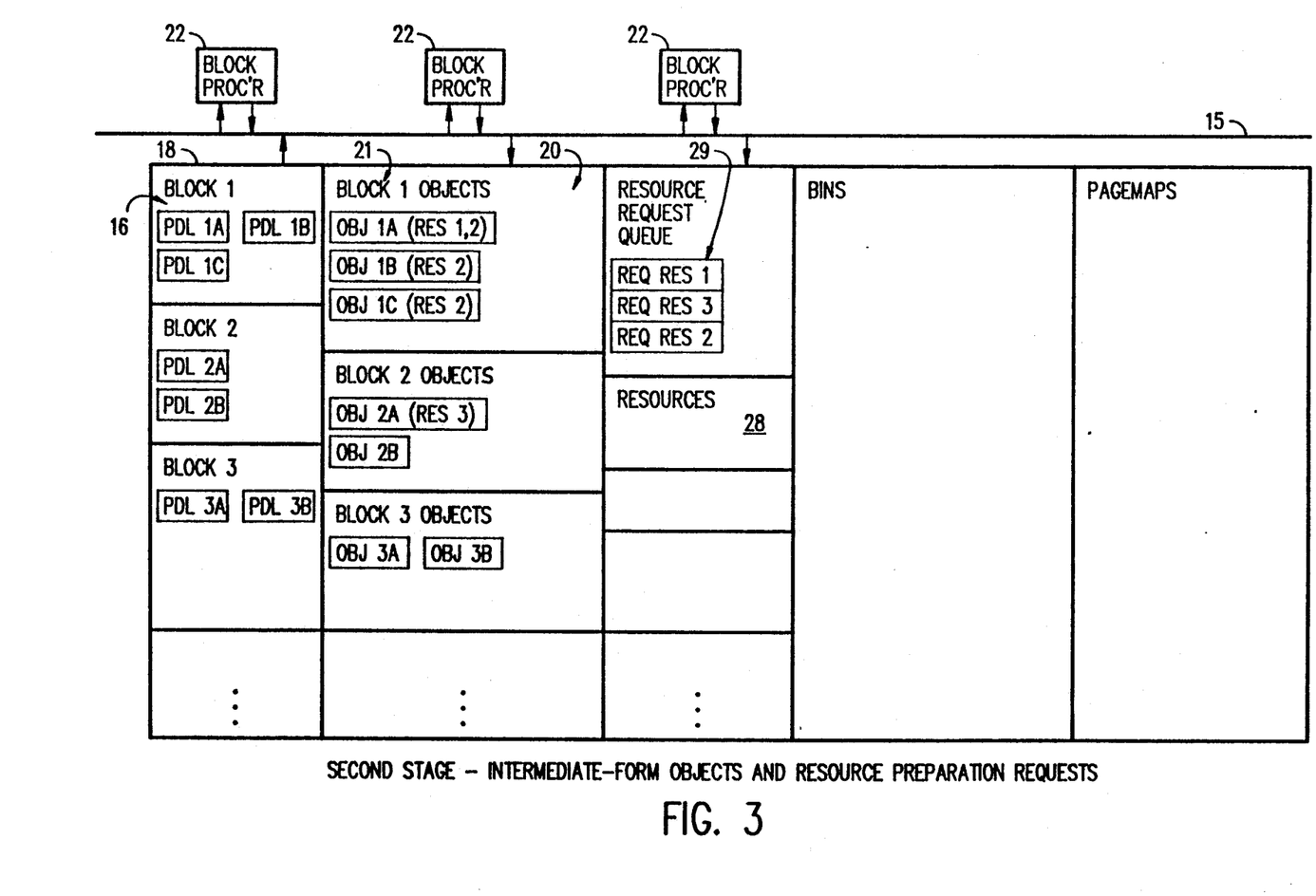
FIG. 3 is a block diagram of the second stage of the rasterizer of FIG. 1, during which intermediate-form objects and resource requests are prepared by the block processors.

As shown in FIG. 3, the block processors 22 convert the state-independent datastream blocks 16 into intermediate-form objects 20 during the second stage. The form of the blocks clearly depends on the particular PDL being processed, and so the block processors' programming must be tailored to the PDL. However, the resulting intermediate-form data 20 can be independent of the particular PDL input.

The second stage block processing is carried out in parallel for multiple blocks 16 by multiple block processors 22. Each of the block processors 22 parses and interprets the block's PDL 16, and executes complicated graphics operations such as rotation and scaling, and most of the rendering. The block processor 22 also identifies references to reusable resources 28 such as text characters, and places requests 34 for the preparation of intermediate-form data for those resources on the resource preparation request queue, as described more fully below under the heading "Resource Preparation". The intermediate-form objects 20 generated from any given block 16 are generated sequentially by a single block processor 22 and are placed sequentially in a portion 21 of the common memory 18 reserved for that block. Therefore, it is sufficient to store the block sequence number only once per block.

To summarize, the second stage takes state-independent datastream blocks and converts them in parallel into collections of intermediate-form objects. Each block is processed by a different block processor, and the objects resulting from any given block are jointly marked with the block's sequence number and stored together. The second stage also produces resource-preparation requests.

Resource Preparation Process

Figure 4:
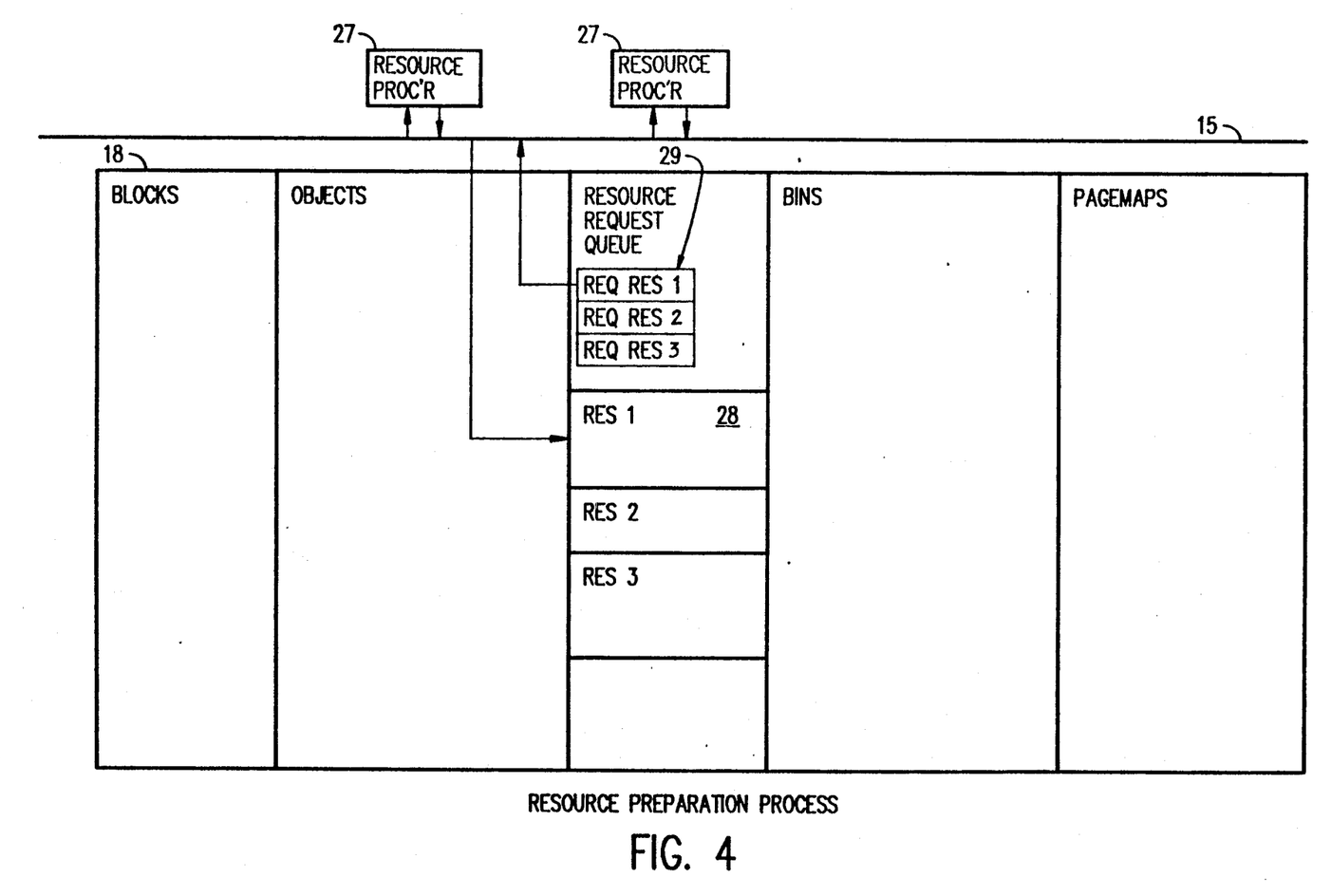
FIG. 4 is a block diagram of the resource preparation process of the rasterizer of FIG. 1.

Resources comprising intermediate-form data for multiply-used items are prepared in parallel to the block processing and sorting of the second and third stages, as shown in FIG. 4.

In the second stage, whenever a block processor 22 determines that the datastream 12 specifies an unprepared reusable item, that block processor reserves a place 28 in the common memory 18 to store intermediate-form data (the resource) for that item, and puts a "resource preparation request" 29 into a common queue (list) of resource preparation requests. At the same time, the block processor 22 initializes a "resource reference count" to keep track of the number of times that resource is specified by various blocks. The block processor 22 then continues to process its block 16 without preparing the resource's intermediate-form data. Each resource preparation request 29 is taken up in order from the resource queue by one of the resource processors 27, which prepares the resource's intermediate-form data 28 and stores it in the place reserved for it in the common memory 18.

Once a resource has been requested, as a later block processor 22 encounters a specification of an already-requested resource item, it simply places in the intermediate-form object 20 under construction a pointer to the resource 28 stored in memory, and updates that resource's reference count so that the resource's intermediate-form data 28 is not deleted prematurely. The pointer is then used by the bin processor 30 processing that object 20 to obtain the resource's intermediate-form data 28.

In this way, intermediate-form data for frequently-used resource items is prepared only once, thereby reducing duplicated effort and improving the rasterizer's performance.

Geographical Sorting—Third Stage

Figure 5:
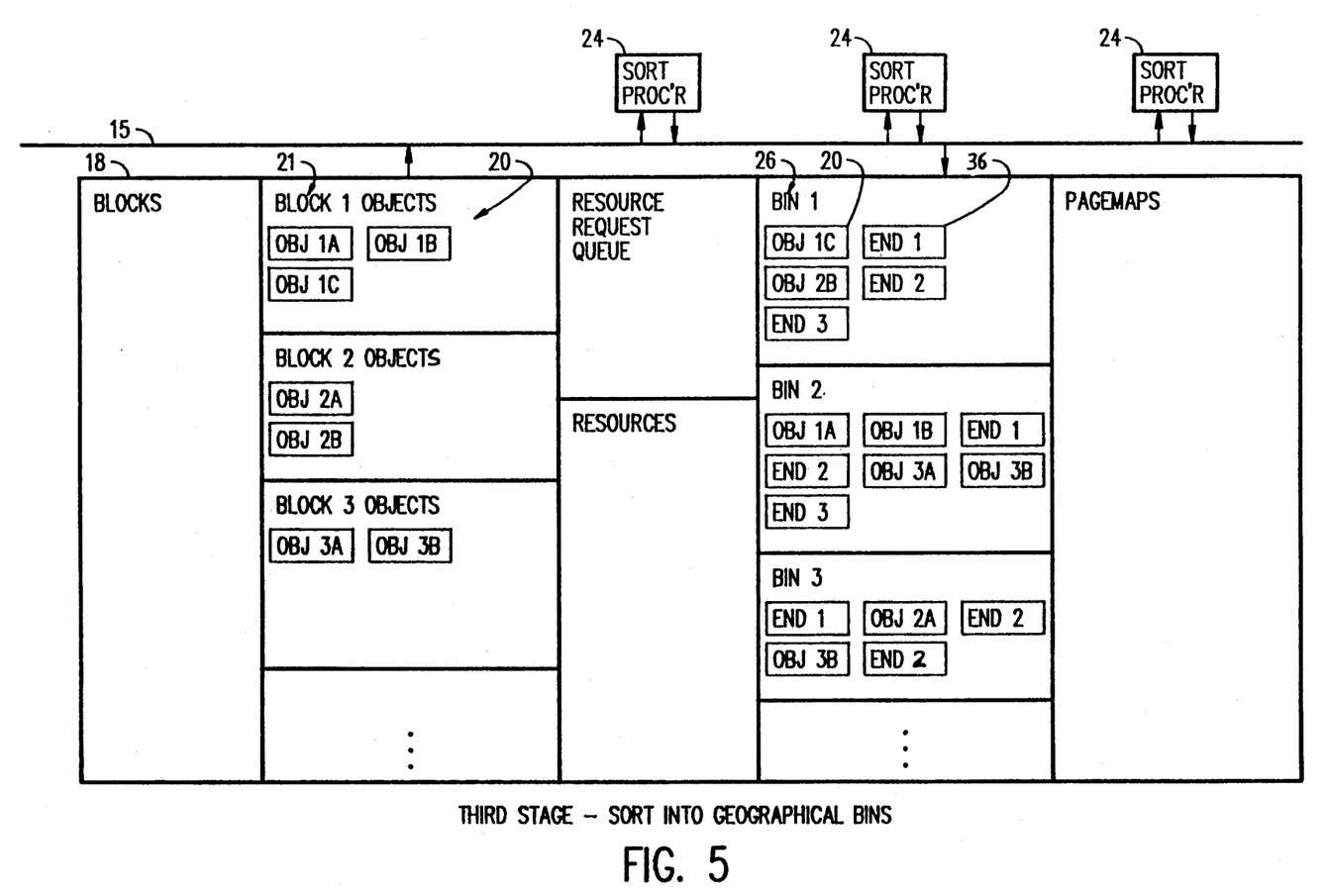
FIG. 5 is a block diagram of the third stage of the rasterizer of FIG. 1, during which the sort processors sort the intermediate-form objects into geographical bins.

As shown in FIG. 5, in the third stage the intermediate-form objects 20 are sorted into bins 26 that correspond to geographic regions of the pagemap 13 being built.

The third stage's sorting is carried out in parallel for different blocks' groups 21 of objects 20 on multiple sort processors 24, but is performed sequentially within each block's objects. The third stage does not depend on the input PDL, since the objects 20 to be sorted are in intermediate-form. The implementation details necessary for correctly sorting the objects 20 in order by both bin 26 and block number 32 are described fully below.

The partition of the pagemap 13 into geographic regions is done before the third stage begins. The regions of the pagemap 13 are defined in advance to be non-overlapping and to together cover the entire page, and are known to each sort processor 24. At the same time, a number of "fourth-stage-work-queues" are created for each pagemap 13, one for each geographical region. These queues can be accessed by all the sort processors 24. In our preferred embodiment, a fourth-stage-work queue and the objects pointed at by its entries together comprise the embodiment of a "bin". The choice of region shapes and intermediate-form object types is made to facilitate the sorting of this third stage. In this embodiment, for example, the regions are chosen to be horizontal bands of the page and the intermediate-form objects 20 are restricted to being either trapezoids or rectangles whose bases are parallel to the bands comprising the regions. The partition of the pagemap is assigned to one or more of the processors essentially as a matter of design choice. If the first stage is parallelized hierarchically as described below, the initial "simple" scan processor (which divides the datastream 12 into pagemap-sized superblocks) may define the regions for each pagemap it identifies. Alternatively the regions may be defined uniformly for all of the pagemaps.

Each bin 26 is a designated area of the common memory 18 for storing the intermediate-form objects 20 to be printed (wholly or partly) in the bin's respective geographical region. Each object 20 is stored in the bin(s) 26 corresponding to the geographical region where the object will be placed in the pagemap 13, together with the object's respective block sequence number 32 in order to maintain the objects in block number order within each bin.

In the "sort" step of the third stage, each block's group 21 of objects 20 is sorted into a number of temporary work areas, each work area corresponding to a geographic region of the pagemap 13, i.e. to a bin 26. Each sort processor 24 receives a series of intermediate-form objects 20 which were generated from a common datastream block 16 and stored together in that block's portion 21 of the common memory. Before beginning the sort step, the sort processor 24 acquires an allocation of a number of temporary work areas within the common memory 18, one portion per geographic region, and places the block's sequence number 32 at the beginning of every work area. The sort processor 24 examines each object 20 within the block's portion 21 of memory to determine which region(s) of the pagemap 13 it is destined for, and places the object in the temporary work area corresponding to the object's regions accordingly. If an object 20 spans several regions, it is placed in the work area for each region. When a sort processor 24 finishes sorting the group 21 of objects 20 of a given block 16 into temporary work areas it places an "end-of-block marker" for that block in all of the work areas it acquired. The inclusion of the end-of-block markers is explained below.

The sort processor 24 then inserts pointers into the fourth-stage-work-queue for each geographical region of the pagemap 13, the pointers pointing to the corresponding work areas that the sort processor 24 just created. These pointers are placed in positions in the fourth-stage-work-queues according to the block sequence number 36 of the block 16 just sorted by the sort processor 24, so that the objects will be processed in the fourth stage in block number order. The work area used by the sort processor 24 is released by the sort processor at this time, but the work area's memory is not deallocated until the fourth stage bin processors 30 have processed the objects in the work area.

Figure 8:
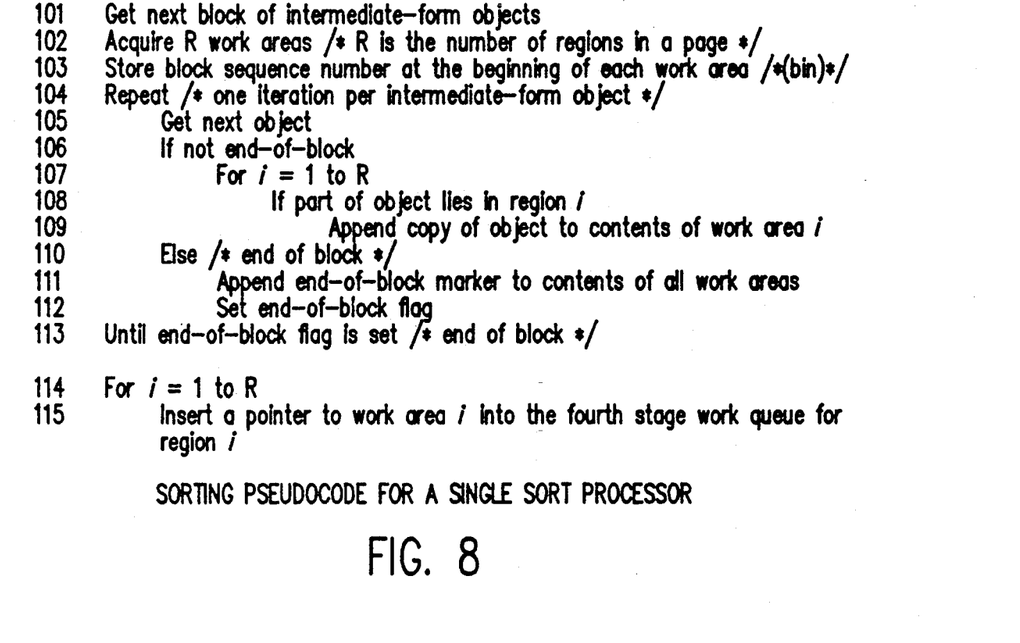
FIG. 8 is a pseudocode implementation of the third stage sorting intermediate-form objects within a single sort processor.

A pseudocode implementation of the third stage sorting is shown in FIG. 8.

Figure 10:
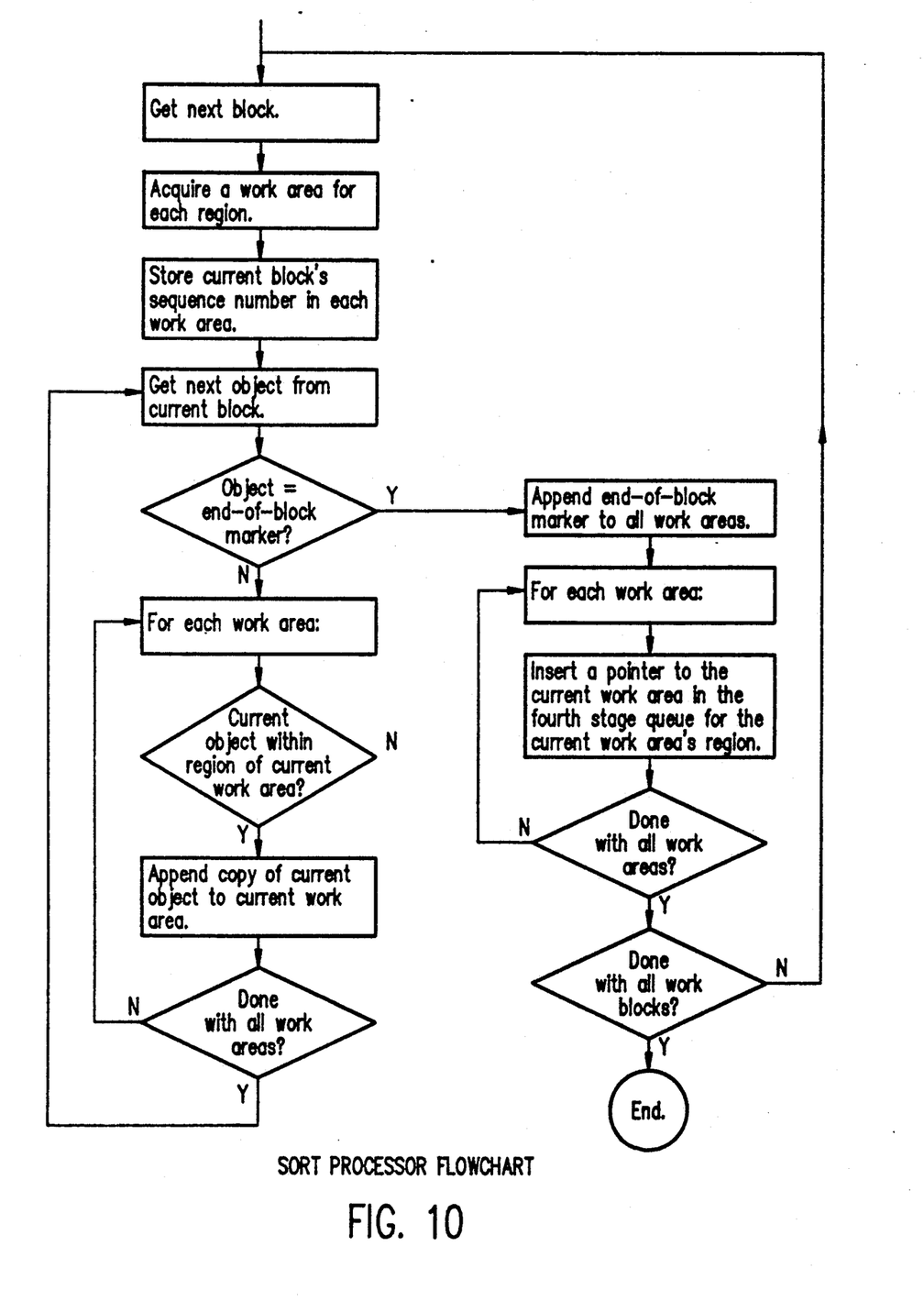
FIG. 10 is a programming flowchart corresponding to the pseudocode of FIG. 8.

FIG. 10 contains a flowchart corresponding to the pseudocode of FIG. 8. The reference numerals assigned to the boxes of the flowchart correspond to the line numbers of the pseudocode.

Building the pagemap

Figure 6:
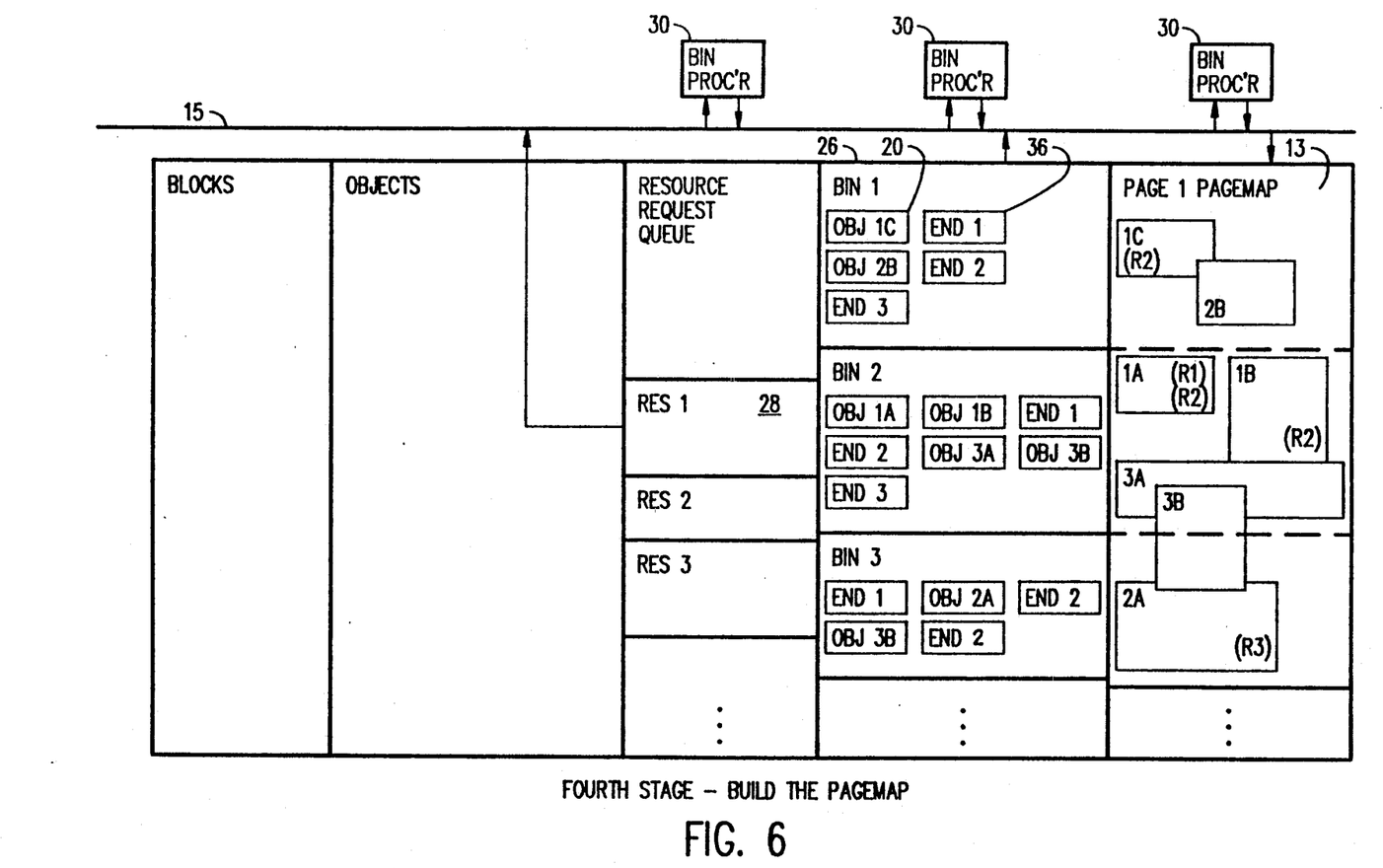
FIG. 6 is a block diagram of the fourth stage of the rasterizer of FIG. 1, during which the bin processors convert the sorted intermediate-form objects and the prepared resources into rasterized pelmaps and build the pagemap.

In the fourth and final stage, bin processors 30 convert the intermediate-form objects 20 stored in the bins 26 into pelmaps (collections of color values of individual pels), and merge them into the pagemap 13 to complete the rasterization process. Unlike the second and third stages where the parallelism is by block, the parallelism in the fourth stage is geographic since the bins 26 corresponding to different geographical regions are processed in parallel by different bin processors 30.

First, each bin processor 30 is assigned a bin 26, with no bin assigned to more than one bin processor. Thus only one bin processor 30 ever updates the region of the pagemap 13 corrsponding to a particular bin 26.

Each bin processor 30 processes the objects 20 in its bin 26 in block number order, since the objects 20 are stored within each bin 26 in block number order by the sort processors 24 during the second stage. This block number ordering within each bin 26 maintains the correct order of objects within the same region but generated by different blocks. Within each bin 26, the correct order of the objects 20 from a particular block is maintained by the sequential placement of those objects into the bin 26. The order among objects that were generated from different blocks (in parallel) is maintained by the block sequence numbers.

A bin processor 30 must finish all objects 20 in its bin 26 from a given block before starting on objects from the next higher numbered block. Since the objects 20 are generated by the block processors 22 in parallel with variable delay and duration, the bin processor 30 must be notified explicitly by the sort processors 24 that all objects from a particular block have been generated. This is accomplished by the sort processors' storing of the end-of-block markers 36 in the bins 26.

Whenever a bin processor 30 encounters a reference to a resource 28, it checks to see whether the resource preparation has been completed. If the resource preparation has not been completed, i.e. if the resource is not ready, the bin processor 30 must wait for it. When a resource 28 is ready, a bin processor 30 needing it uses the pointer placed in the intermediate-form object to locate the resource's intermediate-form data. The bin processor 30 converts the resource's intermediate-form data 28 into a pelmap and places it in position in the pagemap 13. After using a resource 28 the bin processor 30 decrements the resource's reference count. When a resource's reference count is reduced to zero, meaning that it is no longer needed, the resource's intermediate-form data can be deallocated. Resource deallocation is done as needed, so that more frequently used resources are not immediately deallocated even though there may be no outstanding requests for them at a particular time. Suitable deallocation methods such as the "least recently used" and "least frequently used" methods are well known in the prior art.

When the pagemap 13 has been built, it is sent to a printer for printing. The printer 33 is a conventional all-points-addressable (APA) printer such as the IBM model 3812-002 PAGEPRINTER or the IBM model 4019 LASERPRINTER.

If there are more bins 26 than bin processors 30, a bin processor can be assigned multiple bins. When such a bin processor has to wait for objects 20 of one bin 26 to be prepared and sorted it can try to work on its other bin(s). If a bin processor 30 reaches the end of the pagemap 13 for its bins 26, it begins processing another bin which has not yet been assigned to a bin processor.

The fourth, pagemap-building, stage is clearly independent of the PDL used in the datastream. It also requires only relatively simple processing, though the volume of data to be processed is large. Even though this could profitably be done using specialized hardware, we prefer to use general purpose microprocessors.

Figure 9:
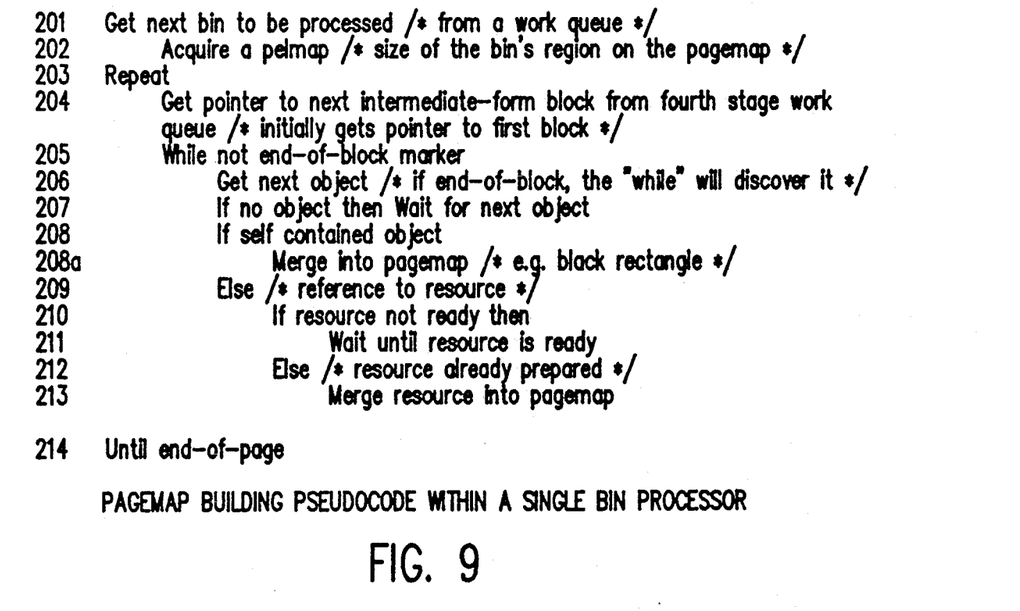
FIG. 9 is a pseudocode implementation of the fourth stage building of a region of the pagemap within a single bin processor.

FIG. 9 shows a pseudocode implementation of the fourth, pagemap-building, stage. Line 207 represents the possibility that one of the block processors 22 is taking a long time. Having processed all the objects 20 from a particular block 16 and not encountered that block's end-of-block marker 36, the bin processor 30 knows that the block's block processor 22 is not yet done with the block. The bin processor 30 must simply wait until the block 16 has been processed and sorted and the block's end-of-block marker 36 appears in the bin processor's bin 26. The prior art contains several suitable waiting and notification schemes which can be used here.

Figure 11:
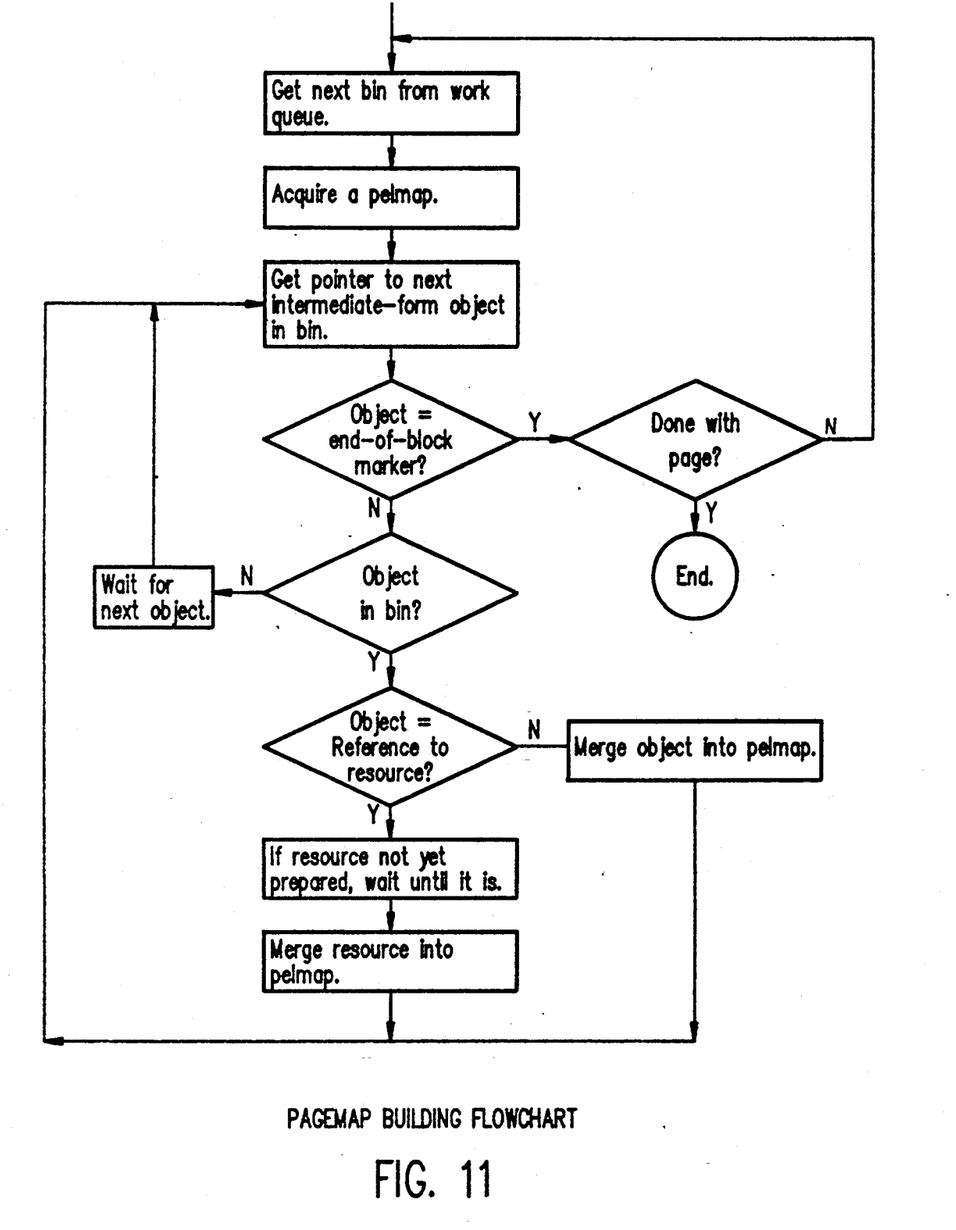
FIG. 11 is a programming flowchart corresponding to the pseudocode of FIG. 9.

FIG. 11 contains a flowchart corresponding to the pseudocode of FIG. 9. The reference numerals assigned to the boxes of the flowchart correspond to the line numbers of the pseudocode.

Illustrative Example

The operation of the rasterizer 10 is illustrated with reference to FIGS. 2-6.

Referring first to FIG. 2, in the first stage the PDL datastream 12 is received by the scan processor 14 and divided into blocks 16. Only the first three blocks of the first page PAGE 1 are shown, although a typical datastream would contain tens, hundreds or thousands of blocks specifying multiple pages. Each block contains fragments of the datastream PDL which will result in one or more objects in later stages of the rasterization. Thus one small fragment of the datastream may result in multiple objects. For example, a datastream command to draw a circle may be converted into a large number of trapezoidal objects. For purposes of illustration only, FIGS. 2-3 show each object as having a unique corresponding fragment of the datastream in a block. BLOCK 1 is shown as having PDL fragments PDL 1A, PDL 1B, and PDL 1C. Similarly, BLOCK 2 contains PDL 2A and PDL 2B, and BLOCK 3 contains PDL 3A and PDL 3B.

In the second stage 17 as illustrated in FIG. 3, a different block processor 22 converts each block 16 into a corresponding group 21 of intermediate-form data objects 20. Because the block processors 22 operate in parallel on the blocks 16, there is not necessarily any correspondence between a block's sequence number 36 and the block processor which processes the block.

In this example of the second stage 17, BLOCK 1 is converted into three intermediate form objects, OBJ 1A, OBJ 1B, and OBJ 1C. Further, BLOCK 1 contains datastream fragments for two multiply-used resources identified as RES 1 and RES 2. The block processor 22 processing BLOCK 1 places resource-preparation requests 29 for these resources, REQ RES 1 and REQ RES 2, on the resource preparation request queue. The block processor also places pointers to the storage locations for these resources' intermediate form data 28 in the objects which use the resources. Thus, OBJ 1A contains pointers to RES 1 and RES 2, and OBJ 1B and OBJ 1C include pointers to resource RES 2.

Similarly, BLOCK 2 is converted into intermediate form objects OBJ 2A and OBJ 2B and resource preparation request REQ RES 3, and BLOCK 3 is converted into OBJ 3A and OBJ 3B. It will be noted that the objects 20 are of varying size—size being typically (but not necessarily) related to the size or complexity of the resulting image.

The resource preparation process is illustrated in FIG. 4. Two resource processors 27 take resource preparation requests 29 from the resource preparation request queue and prepare and store the requested resources' intermediate form data 28. The resources' intermediate form data 28 is stored in the common memory 18 at the locations allocated by the block processors 22 which requested the resources' preparation during the second stage 17. Thus, REQ RES 1 is processed and the intermediate-form data 28 for RES 1 is stored in the common memory 18. Similarly, REQ RES 2 and REQ RES 3 are processed to produce RES 2 and RES 3.

The third stage 23 sorting of intermediate form objects 20 by geographical location is illustrated in FIG. 5, where three sort processors 24 sort the groups 21 of objects. As in the second stage 17, there is no necessary correlation between a block's block sequence number 36 and the sort processor 24 which sorts that block's objects.

In this example of the third stage 23, BLOCK 1's objects OBJ 1A and OBJ 1B specify images which will be located in a geographical region of the page map 13 which has been assigned to BIN 2, and these objects (or more accurately, pointers to them) are placed in BIN 2. BLOCK 1's third object OBJ 1C is placed in BIN 1. The sort processor 24 then places end-of-block markers 36 END 1 for BLOCK 1 in all of the bins 26 for the pagemap 13 being rasterized.

Similarly, the objects of BLOCK 2 are placed in their respective bins, with OBJ 2A going into BIN 3 and OBJ 2B going into BIN 1 and BLOCK 3's object OBJ 3A is placed in BIN 2. OBJ 3B overlaps into the regions of both BIN 2 and BIN 3, and is therefore placed in both of those bins 26.

The fourth stage 31, illustrated in FIG. 6, produces the rasterized pagemap 13. The parallel bin processors 30, each processing the objects 20 of a single bin 26, produce rasterized pelmaps of their respective bins' geographic regions. These pelmaps together comprise the pagemap 13.

The bin processor processing the contents of BIN 1 first rasterizers OBJ 1C, which requires rasterization of that object's associated resource RES 2. The result of this is placement of the rasterized image 1C which contains the rasterized resource image (R2) in BIN 1's pelmap. The bin processor then processes the end-of-block marker 36 END 1, and proceeds to rasterize the object OBJ 2B and place it in BIN 1's pelmap. Image 2B partially superposes image 1C, and because this datastream 12 specifies overpaint mixing mode, image 2B (which appears later in the datastream) partially covers image 1C where they are superimposed. The bin processor 30 for BIN 1 then encounters the markers END 2 and END 3, and proceeds to begin processing the next bin.

The bin processor processing BIN 2 rasterizes OBJ 1A and its resources RES 1 and RES 2, producing image 1A containing rasterized resource images (R1) and (R2). Image 1B containing resource image (R2) is produced similarly, as is image 3A after the markers END 1 and END 2 are encountered. As with BIN 1, because image 3A superposes image 1B, and because OBJ 3A occurred later in the datastream 12, image 3A partially covers image 1B. Finally in BIN 2, object OBJ 3B which overlaps the regions of BIN 2 and BIN 3 is rasterized into image 3B, which partially superimposes and covers image 3A.

In BIN 3, image 2A containing rasterized resource image (R3) is placed in the pelmap, followed by that portion of image 3B in BIN 3's region.

In the end, the pagemap 13 for PAGE 1 is assembled from the pelmaps which it comprises, and can then be sent to the printer for printing.

Alternative Embodiments

It will be appreciated that, although specific embodiments of the invention have been described herein for purposes of illustration, various modifications may be made without departing from the spirit and scope of the invention. In particular, while the preferred embodiment produces printer pagemaps, the invention is also applicable to displays used for the imaging of 2-dimensional objects, as well as other applications which need to convert high-level descriptions of two-dimensional objects into rasterized pagemaps or other pel-map representations.

And although the first scanning stage of the preferred embodiment is preformed sequentially by a single scan processor 14, the scanning of the datastream 12 may be parallelized. In one such arrangement, an initial simple sequential scan processor will divide the datastream into blocks that contain the datastream for entire pages, each of which is then handed over to one of several parallel complex scan processors for separation into smaller state-independent blocks. In this way a block is divided into several state-independent sub-blocks, each of which has a sequence number, so that separate block processors and sort processors may work on the main block concurrently. In addition, the scan processor and block processors of this invention may be specialized to handle particular types of blocks, in some ways similarly to the "functional" rasterizers of the prior art.

Also, while the preferred embodiment sorts all the objects of any given block by a single sort processor, it is contemplated that multiple sort processors may operate on objects of the same block provided that each object has been stored with its own block sequence number by its block's second stage block processor. Alternatively, the third stage's sorting can be merged with the second stage's creation of intermediate-form objects, although this reduces the number of stages which can be pipelined and may thereby reduce the rasterizer's performance in some situations.

Further, is understood that while the preferred embodiment uses multiple separate microprocessors, the stages of the invention can be performed as well by a single, multi-tasking programmed general purpose digital-computer such as a multi-processor processor IBM model "3090" mainframe computer, or an IBM "PS/2" personal computer running a multi-tasking operating system such as IBM's "OS/2 EXTENDED EDITION". Alternatively, one may use different type processors for each stage in order to individually optimized the processors for each stage. Such different processor types might then be connected to separate partitions of memory rather than having access to the entire common memory, allowing concurrent access by the processors to different areas in memory and thereby increasing the communication bandwidth without requiring faster memory or processors.

Resource preparation may be combined with the second stage preparation of intermediate-form data. This may avoid a possible difficulty in allocating an unknown amount of memory for a resource of unknown size. However eliminating parallel resource preparation may slow the rasterizer's performance when a single datastream block requires the preparation of many resources, since a single block processor would have to do all the work.

It is understood that while the rasterizer 10 is described as a pre-processor separate from the printer 33, it is merely a matter of design choice whether to incorporate the rasterizer within the computer running the application which produces the datastream, or to incorporate the rasterizer within the printer, or to construct the rasterizer as a separate component. Where datastream-producing applications are run on computers capable of multi-tasking, the rasterization according to this invention may be performed as an application-like post-processor. Where datastream-producing applications are run on computers capable of multi-threading within single applications, rasterization according to this invention may be performed within the application.

Comparison With Prior Art

The rasterizer of this invention outperforms the simple pipeline rasterizers of the prior, both by providing parallelism in each stage and by mitigating the load balancing problem. With this invention one can assign different number of processors statically or dynamically to the different stages based on the relative load on the stages.

This invention offers important advantages over prior art page-parallel rasterizers. Since several processors work on the same page, substantially less memory is required for pagemaps for any given number of processors, resulting in cost savings on memory. This invention also rasterizes difficult pages faster than the page-parallel rasterizer, because multiple block, sort and bin processors cooperate to work on the blocks and regions of each pagemap. Lastly, processors are not idle even if page complexity is highly variable, and this does not require additional memory.

Although the 3-D rasterizers with Z-buffers use two main rasterization phases carried out in parallel by groups of processors, when handling 2-D objects they are unable to correctly handle combinations of mixing rules without requiring unlimited amounts of memory per pel. This is because with multiple mixing modes, objects must be applied in the exact order in which they are specified, and if they are not presented to the pagemap builder in that order it must store all the valued until the page is completed, and only then sort them by sequence number and apply them to the pagemap one by one for a each pel. Even with overpaint mode, for which Z-buffer rasterizers are best suited, it is necessary to store a depth value with each pel. Because pels are represented in printers by between one and four bits, and depth information typically requires at least sixteen bits, Z-buffer rasterizers require enormously more memory than rasterizers according to our invention.

This is because our invention takes advantage of the fact that the order of appearance of objects in the datastream reflects the objects' relative depth, so that objects appearing later in the datastream are "closer" to the viewer and should therefore be overpainted over earlier objects they superpose.

Unlike the "Raster Processing Machine" (RPM), our invention converts the datastream into intermediate-form using parallel processors, eliminating the RPM's bottleneck at that process. Perhaps more importantly, our rasterizer produces a pagemap which correctly places the objects in light of the mixing mode(s) applied, unlike the RPM rasterizer.

Finally, none of the prior art rasterizers provide parallel resource preparation as described herein.

Accordingly, the scope of protection of this invention is limited only by the following claims.

We claim:

1. A method for rasterizing a datastream of sequential commands specifying at least one output image, comprising the computer-implemented steps of
   (a) identifying at least two state-independent blocks of said commands within the datastream, the sequence of received commands in said datastream indicative of image portions that overlap other image portions;
   (b) converting the commands in said blocks, in parallel, into intermediate-form data and maintaining a sequence record of said intermediate-form data; and
   (c) converting into rasterized pelmaps representing at least part of the image, the intermediate-form data for at least two non-overlapping geographical regions of the image in parallel, and for each region, in the same sequence as said sequential commands were received which gave rise to said intermediate-form data for said region.

2. A method according to claim 1, wherein step (b) is pipelined with step (a).

3. A method according to claim 1, wherein step (c) is pipelined with step (b).

4. A method according to claim 1, further comprising, after step b, the step of:
   b(1) sorting, in parallel, the intermediate-form data by geographical region of the image in which said intermediate-form data belongs before converting the intermediate-form data into rasterized pelmaps.

5. A method according to claim 1, further comprising the step of
   (d) assembling the pelmaps into a representation of the image.

6. A method according to claim 5, wherein the datastream comprises commands in a printer page definition language (PDL); and further comprising the step of
   (e) printing the image.

7. A method according to claim 1, wherein steps b, b1, c are performed, in parallel, by programmed general purpose microprocessors.

8. A method according to claim 7, wherein the microprocessors are programmed to perform more than one of the steps (a)–(c).

9. A method according to claim 1, further including, after step b, the steps of:
   b1 determining if any intermediate-form data is to be multiply used; and
   b2 reusing said intermediate-form data in converting the stored intermediate-form data into pelmaps.

10. A method according to claim 9, further including the step of preparing reusable intermediate-form data in parallel for at least two items of the selected block but only converting said reusable intermediate-form data once.

11. A method according to claim 10, wherein the reusable intermediate-form data is prepared in parallel with the conversion of the blocks into intermediate-form data.

12. A method according to claim 10, wherein the reusable intermediate-form data is prepared in parallel with the sorting of the intermediate-form data.

13. A system for rasterizing a datastream of sequential commands specifying at least one output image, comprising:
  means for identifying at least two state-independent blocks of said commands within the datastream, the sequence of received commands in said datastream indicative of image portions that overlap other image portions;
  parallel processing means for converting the commands in said blocks into intermediate-form object data and maintaining a sequence record of said intermediate-form object data; and
  parallel-processing means for converting the intermediate-form object data into rasterized pelmaps of at least two non-overlapping geographic regions of the image and, for each region, in the same sequence as said sequential commands were received which gave rise to said intermediate-form data.

14. A system according to claim 13, wherein the means for converting blocks is pipelined with the means for identifying blocks.

15. A system according to claim 13, wherein the means for converting intermediate-form object data is pipelined with the means for converting blocks.

16. A system according to claim 13, further including parallel-processing means for sorting, in parallel, the intermediate-form object data into the geographical regions of the pagemap in which said intermediate form object data belong.

17. A system according to claim 16, wherein the means for sorting is pipelined with the means for converting blocks; and
  wherein the means for converting intermediate-form object data is pipelined with the means for sorting.

18. A system according to claim 16, wherein the parallel processing means for sorting comprises at least two general purpose microprocessors programmed to operate in parallel.

19. A system according to claim 13, further including means for printing the image based on the pagemap.

20. A system according to claim 19, further including a printer.

21. A system according to claim 13, wherein the parallel processing means for converting the commands in said blocks comprises at least two general purpose microprocessors programmed to operate in parallel.

22. A system according to claim 13, wherein the means for converting intermediate-form object data comprises at least two general purpose microprocessors programmed to operate in parallel.

23. A system according to claim 13, further including means for converting multiply used intermediate-form object data only once and for reusing said intermediate-form object data in converting the intermediate-form data into rasterized pelmaps.

24. A system according to claim 23, further including means for preparing reusable intermediate-form data in parallel for at least two items of the selected block but converting said reusable intermediate-form object data only once.

25. A system according to claim 23, further including means for preparing the reusable intermediate-form data in parallel with the means for converting blocks into intermediate-form data.

26. A system according to claim 23, further including means for preparing the reusable intermediate-form data in parallel with the means for sorting the intermediate-form data.

* * * * *